US006676863B2

(12) United States Patent
Christiaens et al.

(10) Patent No.: US 6,676,863 B2
(45) Date of Patent: Jan. 13, 2004

(54) ROTARY TABLET PRESS AND A METHOD OF USING AND CLEANING THE PRESS

(75) Inventors: Dirk Christiaens, Beersel (BE); Antonie Van Zegbroeck, Kerksken (BE); Jurgen Boeckx, Steenokkerzeel (BE); Jan Vogeleer, Bornem (BE)

(73) Assignee: Courtoy NV, Halle (BE)

( * ) Notice: Subject to any disclaimer, the term of this patent is extended or adjusted under 35 U.S.C. 154(b) by 114 days.

(21) Appl. No.: 09/960,739

(22) Filed: Sep. 24, 2001

(65) Prior Publication Data

US 2003/0042639 A1 Mar. 6, 2003

(30) Foreign Application Priority Data

Sep. 5, 2001 (WO) ................................ PCT/IB01/01631

(51) Int. Cl.[7] .......................... B29B 11/12; B29C 37/00

(52) U.S. Cl. ........................... 264/39; 264/85; 264/109; 425/225; 425/227; 425/229; 425/345; 425/353

(58) Field of Search ..................... 264/39, 85, 109–128

(56) References Cited

U.S. PATENT DOCUMENTS

| | | | | |
|---|---|---|---|---|
| 3,533,360 A | | 10/1970 | Kibbe | |
| 4,259,049 A | | 3/1981 | Willich | |
| 4,403,935 A | | 9/1983 | Crossley et al. | |
| 4,408,975 A | | 10/1983 | Hack | |
| 4,988,275 A | | 1/1991 | Hinzpeter et al. | |
| 5,462,427 A | | 10/1995 | Kramer | |
| 5,536,331 A | | 7/1996 | Korsch | |
| 5,843,488 A | * | 12/1998 | Korsch et al. | 425/193 |
| 5,910,324 A | | 6/1999 | Koch | |

FOREIGN PATENT DOCUMENTS

| | | |
|---|---|---|
| EP | 0 288 798 B1 | 11/1988 |
| EP | 0 059 808 A2 | 9/1992 |
| EP | 0 637 507 B1 | 2/1995 |
| EP | 1 050 399 A3 | 11/2000 |
| EP | 1 050 399 A2 | 11/2000 |
| JP | 2 992 529 B1 | 10/1999 |

* cited by examiner

*Primary Examiner*—Stephen J. Lechert, Jr.
(74) *Attorney, Agent, or Firm*—Sughrue Mion, PLLC

(57) ABSTRACT

The rotary tablet press comprises a housing, in which a compression unit (14) is detachably mounted. The compression unit (14) comprises a die table (15) with punches (17, 18), a feeding device for the supply of material to be compressed into the dies (16), and a tablet discharge device for removal of compressed material in the form of tablets. The compression unit (14) encloses each die opening and its corresponding first punch end (21, 22) in a chamber, the feeding device and the tablet discharge device are enclosed, the feeding device communicates with an inlet for detachable connection with an external supply channel, and the tablet discharge device communicates with an outlet.

22 Claims, 7 Drawing Sheets

ROTARY TABLET PRESS AND A METHOD OF USING AND CLEANING THE PRESS

CROSS REFERENCE TO RELATED APPLICATIONS

The present application claims the benefit of priority from International Patent Application PCT/IB01/01631 filed on Sep. 5, 2001.

BACKGROUND OF THE INVENTION

The present invention relates to a rotary tablet press comprising a housing, a rotary die table detachably connected to a drive shaft arranged in the housing for rotation of the die table, a number of dies arranged circumferentially in the die table, each die being associated with at least a first punch having a first end receivable in the die through an opening of the die and arranged for compression of a powder or granular material in the die by reciprocation of the punch, and at least a cam for cooperation with a second end of the punches in order to effect axial displacement of the punches by rotation of the die table, whereby a compression unit detachably mounted in the housing comprises the die table with punches, a feeding device for the supply of material to be compressed into the dies, and a tablet dish charge device for removal of compressed material in the form of tablets.

EP 0288 798 describes a tablet press having a die table rotatable about a vertical axis, each die having associated top and bottom punches receivable therein and the punches being guided by top and bottom cams, respectively, whereby the cams are stationary relative to the press housing. In order to facilitate change-over as well as cleaning of components between batches, the die table with punches and cams is detachable as a unit from the press housing.

EP 1 050 399 describes a rotary tablet press of the same type, in which the exchange of components between batches has been further improved by the provision of a U-shaped rigid connection frame between the top and bottom cams. The connection frame is detachably connected with the press housing, whereby the unit comprising connection frame, die table, punches and cams may be removed in a single operation by disconnection of the connection frame from the housing and disengagement of the die table from its drive shaft, Further, it is possible to fit auxiliary equipment, such as powder feeder and tablet outlet, on the connection frame, so that these components may be removed together with the unit.

Although these prior art tablet presses make it possible to replace a unit comprising the die table and more or less other components with a corresponding unit which has been cleaned in the meantime, it is still necessary to manually clean the remaining part of the press housing which surrounds the die table during production. During these cleaning operations, the production stands still. Further, the contaminated die table with associated components must subsequently be transported to a cleaning site, manually disassembled, cleaned and eventually assembled. During all these operations, the environment is contaminated with the product and the operator is exposed to the product. In addition, the operations are very time-consuming and therefore costly.

Moreover, by change-over between batches of toxic products, it is necessary to employ a so-called isolator or glove box built around the tablet press in order to prevent any contamination of the surroundings by the product. In this case, cleaning is much more difficult due to the limited accessibility and manoeuvrability in the glove box or isolator.

EP 0 637 507 describes a rotary tablet press provided with equipment for so-called washing-in-place (WIP) in the form of spray nozzles for spraying of washing agent onto the die table and associated components as well as suction pipes for draining off the washing agent. In known tablet presses of this type, it is, however, a problem that the washing by means of spray nozzles is not efficient enough to achieve the required final cleanliness due to the fact that the washing agent cannot adequately enter the complex construction of the die table with punches, the powder feeder and tablet outlet etc. Consequently, a time-consuming final manual cleaning of the tablet press is still necessary. The preceding washing-in-place operations by means of the spray nozzles also take long time, for instance up to eight hours, mainly due to long drying and cooling cycles after the wash cycle. During these cycles, the tablet press is out of production. In addition, the equipment required for washing-in-place comprises several spray nozzles and suction pipes, etc., and consequently increases the price of the tablet press considerably.

U.S. Pat. No. 4,259,049 describes a rotary tablet press in which some of the negative effects of dust generation have been alleviated during production. The leading end portions of the punches are surrounded by cuffs, through which gas is blown towards the front ends of the punches to prevent deposition of dust on the punch surfaces. In order to prevent the dust blown away from the punches from deposition on other components in the press housing during operation, said cuffs are surrounded by suction chambers provided by stationary mounted shields. However, due to these shields, change-over as well as cleaning of the machine between batches are even more complicated and consequently time-consuming, as the shields have to be removed manually to access the dies and associated punches. As this tablet press does not provide for removal of the die table and punches as a unit, these components must subsequently be disassembled also manually and one by one, all operations which are very time-consuming and must be done during stand-still of the machine.

BRIEF SUMMARY OF THE INVENTION

The object of the present invention is to provide a tablet press by which the time required for cleaning of the press between batches is reduced compared to prior art presses and by which the risk of contamination of the surrounding environment as well as exposure of the operator to the product may be reduced to a minimum.

In view of this object, the compression unit encloses each die opening and its corresponding first punch end in a chamber, the feeding device and the tablet discharge device are enclosed, the feeding device communicates with an inlet for detachable connection with an external supply channel, and the tablet discharge device communicates with an outlet.

By enclosing both the area around the die where the tablets are compressed and the feeding and discharge devices, it is possible to keep the product always confined in the detachable compression unit, and the external supply channel, and by furthermore providing a releasable connection between the feeding device and the external supply channel, the compression unit may between batches fast and easily in a single operation be exchanged for an already cleaned unit, without having to clean supplementary parts of the tablet press, other than the supply channel, and without the operator being exposed to the product. Whereas the supply channel may be readily cleaned by means of well known techniques, such as cleaning-in-place (CIP) by means of spray nozzles, the compression unit requires a much more thorough cleaning procedure.

According to the invention, because the used compression unit confines the product residues, the unit may be transported to a dedicated cleaning station without contamination of the environment. The cleaning of the unit may be carried out manually, possibly in an isolator, without delaying the production, as another already cleaned unit is mounted in the tablet press for the production, but the cleaning may advantageously be automated. In a dedicated automated cleaning station, it is possible to clean the compression unit much more thoroughly and also faster than it is possible in the known tablet presses provided with washing-in-place equipment, because the unit is separated from its surroundings in the press, so that the operation of the cleaning equipment is not restricted by the limited space in the press. Further, the function of the tablet press is not affected by the presence of the cleaning equipment. As a result, the unit may be manipulated much more extensively by dedicated equipment, for example the punches may be moved vigorously in their dies during spraying with cleaning agent, the tablet feeder may be moved or even disassembled automatically, etc.

In addition, one automated cleaning station equipped with sophisticated manipulators and spray nozzles is able to serve several tablet presses which do only have to be out of production during a very reduced time for exchange of the compression unit between batches. As a result, in a production plant consisting of more tablet presses, the expenses of cleaning equipment are much reduced compared to tablet presses provided with cleaning-in-place equipment, because in the latter case, each press must be provided with expensive cleaning equipment.

In a preferred embodiment, the second punch ends are accessible for actuation from outside the compression unit. In this way, it is possible to accommodate actuation means, such as rollers and possibly the cams, in the press housing, whereby this equipment does not have to be replaced with the compression unit between batches, and furthermore it is possible to keep the actuation means outside the enclosed product area, so that the operation of this equipment is not negatively effected by the product particles, and so that the equipment does not have to be cleaned between batches. In addition, possible lubrication of the actuation means cannot result in contamination of the product with lubricants.

In a structurally particularly advantageous embodiment, the compression unit comprises a casing surrounding at least part of the die table, the feeding device and the tablet discharge device, and the inlet and the tablet outlet are arranged in a wall of the casing. By enclosing the compression unit by means of an integrated surrounding casing, cleaning of the unit in a dedicated cleaning station may furthermore be facilitated, the circulation of cleaning fluid in the casing may be optimised by appropriate design of the casing. In a cleaning station, supply and drainage of cleaning fluid may advantageously be conducted through the product inlet and the tablet outlet of the casing, respectively.

The casing of the compression unit may be provided with a releasable opening mechanism for opening of at least one door in the casing or detachment of at least a part of the casing from the compression unit in order to facilitate cleaning of the unit. The opening of the casing may advantageously be performed automatically in a closed chamber in an automatic cleaning station.

In an advantageous embodiment, each die is associated with first and second punches arranged for reciprocation in a direction parallel with the axis of rotation of the die table, the first and second punches are received in guides on either side of the die, respectively, said guides being accommodated in a rotary turret comprising the die table, the casing comprised by the compression unit surrounds the periphery of the turret and is sealed against the latter by means of seals permitting rotation of the turret in relation to the casing, and the casing has a bracket connected rotatably with the turret by means of a bearing. In this way, the second punch ends may project from opposed ends of the turret for actuation, and the compression area may be delimited by the periphery of the turret and the surrounding stationary casing. A tight sealing between the turret and the casing may be achieved as a result of the bearing centring the casing in relation to the turret.

The punches may advantageously be sealed against their guides at the first punch ends by means of seals permitting axial displacement of the punches in the guides, such as lip seals or bellows seals. This prevents product from entering the guide bores and thereby effecting the operation of the punches negatively.

In an advantageous embodiment, the compression unit has auxiliary devices communicating with the press housing via releasable connections, such as dust aspiration nozzles communicating with the press housing via releasable tube connections, a powder feeder driven through a releasable shaft connection by means of a drive accommodated in the tablet press housing, a lubrication system communicating with the press housing via releasable tube connections, etc. This allows optimising the function of the compression unit during production and at the same time ensuring fast and easy exchange of the compression unit. By the provision of dust aspiration nozzles, it is further possible to maintain an underpressure in the enclosure of the compression unit during production, thereby minimizing the risk of any leakage of the product. Even during exchange of the compression unit, an initial underpressure provided in the enclosure before separation of the unit from the press housing may provide additional safety against leakage.

In a preferred embodiment, releasable conduit connections between inlets or outlets of the compression unit and corresponding channels in the press housing are provided with a closure mechanism on either side of a disconnection mechanism. By closing the inlets or outlets in the compression unit and the corresponding channels in the press housing before releasing the connections, the enclosed product is still confined in the compression unit and the corresponding channels after disconnection of the unit from the housing, thereby preventing leakage of the product to the surroundings during exchange of the compression unit.

Advantageously, the releasable conduit connections are in the form of so-called double ball valves. In such a valve, a ball valve is provided on either side of a disconnection mechanism.

For use with toxic products, the releasable conduit connections are preferably in the form of so-called split valves having two mating valve members, such as split butterfly valves. This type of connection permits closing of the conduit passage and subsequently separation of the two valve parts, whereby each of the two mating valve members remains in its corresponding valve part closing the valve opening, practically without any leakage of the product to the surroundings.

Further, the releasable conduit connections may also be in the form of plastic tubes. This permits closing the connections by squeezing the plastic tube and heating it up, whereby it is welded together. The tube may then be cut through in the middle of the weld so that the two resulting tube ends are sealed.

In one embodiment, a number of top cams for cooperation with first punches and a number of bottom cams for cooperation with second punches are mounted on the compression unit for removal from the press housing together with the compression unit.

In another embodiment, a number of top cams for cooperation with first punches are mounted on the compression unit for removal from the press housing together with the compression unit, and a number of bottom cams for cooperation with second punches are mounted in the press housing so that the second punches are releasable from the bottom cams for removal from these together with the compression unit Advantageously, a top cam for cooperation with punches is mounted adjustably on the compression unit. Thereby, in a cleaning station, it is possible to adjust the cam in order to move the punches in a way specifically suited for the cleaning operation, for instance they may be moved more vigorously by cleaning than by the tablet press operation.

In an advantageous embodiment, a compression roller for cooperation with first punches is supported above the compression unit by a height adjustable block, and the height adjustable block has a coupling element for engagement with a corresponding coupling element on the compression unit. In this way, two functions may be carried out by the height adjustable block; the correct height position of the compression roller during production may be set, and the die table of the compression unit may be lifted to disengage it from the drive shaft in the press housing in order to remove the compression unit for cleaning between batches.

In a further advantageous embodiment, the press housing is provided with a swivel arm pivotal about a vertical axis and provided with a coupling element for engagement with a corresponding coupling element on the compression unit. Thereby, the compression unit may after elevation from the drive shaft be swung out of the press housing and placed on a carriage for transfer to a cleaning station, In an advantageous embodiment, the press housing is provided with a separate support for the feeding device, the feeding device is displaceable in relation to the compression unit, and said support has a snap coupling mechanism such as a pneumatic coupling mechanism for connection with the feeding device. The support provides for correct positioning of the feeding device in relation to the die table and the snap coupling mechanism ensures fast and easy disconnection of the feeding device from the support when the compression unit is to be removed.

The present invention also relates to a compression unit for releasable attachment in the housing of a rotary tablet press, the compression unit comprising a rotary die table for connection to a drive shaft arranged in the press housing for rotation of the die table, a number of dies arranged circumferentially in the die table, each die being associated with at least a first punch having a first end receivable in the die through an opening of the die and arranged for compression of a powder or granular material in the die by reciprocation of the punch, a feeding device for the supply of material to be compressed into the dies, and a tablet discharge device for removal of compressed material in the form of tablets, According to the invention, the compression unit encloses each die opening and its corresponding first punch end in a chamber, the feeding device and the tablet discharge device are enclosed, the feeding device communicates with an inlet for detachable connection with an external supply channel, and the tablet discharge device communicates with an outlet.

In an advantageous embodiment, the compression unit comprises a casing surrounding at least part of the die table, the feeding device and the tablet discharge device, the inlet and a tablet outlet are arranged in a wall of the casing, and the casing of the compression unit is provided with a releasable opening mechanism for opening of at least one door in the casing or detachment of at least a part of the casing from the compression unit.

The invention further relates to a cleaning station for automated cleaning of a compression unit detached from a rotary tablet press, the compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets.

According to the invention, the cleaning station comprises at least two separate cleaning fluid devices each having a connection piece for detachable connection with a corresponding connection piece provided on the compression unit and communicating with an enclosure of the compression unit, the cleaning fluid devices being arranged for the supply of cleaning fluid to the compression unit and for the drainage of cleaning fluid from the compression unit. After connecting the connection pieces of the cleaning station with the corresponding connection pieces of the compression unit, possibly by means of snap connections, cleaning fluid may be circulated vigorously through the enclosure, possibly in alternating directions, thereby performing an effective cleaning of all components surrounded by the enclosure of the compression unit.

In an advantageous embodiment, at least one of the cleaning fluid devices is provided with a cleaning fluid spray nozzle arranged for automatic introduction through the corresponding connection piece on the compression unit. In this way, the cleaning fluid may be aimed more directly at the components to be cleaned, thereby ensuring a more effective cleaning.

The invention moreover relates to a cleaning station for automated cleaning of a compression unit detached from a rotary tablet press, the compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets, the cleaning station comprising a cleaning chamber for accommodation of the compression unit during cleaning, and the cleaning chamber being provided with at least a cleaning fluid spray nozzle, which cleaning station comprises an automatic manipulator for opening at least partially a chamber which is comprised by the compression unit and which before opening encloses at least a die opening and its corresponding first punch end. Thereby a very fast and effective cleaning operation is ensured, as the compression unit after placement in the cleaning chamber is cleaned automatically, and very good access to the components of the compression unit is obtained after opening the chamber comprising these components. The cleaning fluid may therefore be sprayed more directly at the components to be cleaned.

The cleaning chamber may be adapted so that the second punch ends are accessible for actuation from outside the cleaning chamber. This may be advantageous, if the second punch ends should be actuated during cleaning, but preferably kept out of contact with the cleaning fluid, thereby avoiding to relubricate these after replacement of the compression unit in the tablet press.

In an advantageous embodiment, the cleaning station comprises a drive shaft for detachable connection to the rotary die table of the compression unit for rotation of the die table during cleaning in order to effect axial displacement of the punches. This ensures effective removal of product particles trapped in the dies as well as particles sticking to the punches, especially around the sealings with their guides.

In a further advantageous embodiment, the cleaning station comprises an automatic manipulator for adjustment of a cam of the compression unit or the cleaning station comprises at least a cam for cooperation with a second end of the punches in order to effect axial displacement of the punches by rotation of the die table. By adjusting the cams of the compression unit or employing specially adapted cams of the cleaning unit, it is possible to move the punches in a way specifically suited for the cleaning operation, as exemplified above.

In a further advantageous embodiment, the cleaning station comprises an automatic manipulator for opening and/or moving a powder feeding device and/or a tablet discharge device of the compression unit. This ensures effective cleaning of the internal components of the powder feeding device and/or the tablet discharge device.

The invention additionally relates to a method of manufacturing tablets or the like in a rotary tablet press having a press housing and a compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets or the like, whereby the compression unit between batches of tablets is detached from the press housing and transferred to a cleaning station.

In the method according to the invention, during the pressing of tablets or the like and during the transfer of the compression unit to the cleaning station each die opening and its corresponding first punch end are maintained enclosed in a chamber of the compression unit and the feeding device and the tablet discharge device are maintained enclosed.

As a result of the above discussed more effective cleaning operation, which is hereby employed between the manufacturing of successive batches of tablets, the risk of contamination of a batch with product particles of a previous batch is minimized. Consequently, an even more pure end product may be obtained and therefore a product of higher quality. Further, because the need for cleaning of the press housing before insertion of a cleaned compression unit is eliminated, machine downtime is reduced, and production costs are reduced, resulting in a more competitive end product.

The invention further relates to a method of cleaning a compression unit detached from a rotary tablet press, the compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets, whereby at least one separate cleaning fluid device by means of a connection piece is connected with a corresponding connection piece provided on the compression unit and communicating with an enclosure of the compression unit, and subsequently cleaning fluid is supplied to the enclosure of the compression unit from the at least one cleaning fluid device. Preferably at least two cleaning fluid devices are employed, whereby cleaning fluid is drained from the enclosure to one of the cleaning fluid devices. The cleaning fluid may be circulated through the enclosure of the compression unit in alternating directions. Thereby the above-mentioned advantages are obtained.

The invention also relates to a method of cleaning a compression unit detached from a rotary tablet press, the compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets, whereby the compression unit is placed in a closed cleaning chamber, whereby, in the closed cleaning chamber, a chamber comprised by the compression unit and enclosing a die opening and its corresponding first punch end is opened, whereupon the compression unit is cleaned by means of cleaning fluid. Thereby the above-mentioned advantages are obtained.

In the closed cleaning chamber, the punches may be removed from the compression unit. This facilitates effective cleaning, as product trapped between the punches and their corresponding guides easier may be removed during cleaning.

BRIEF DESCRIPTION OF THE SEVERAL VIEWS OF THE DRAWING

The invention will now be explained in more detail below by means of examples of embodiments with reference to the schematic drawing, in which.

DETAILED DESCRIPTION OF THE INVENTION

Figure 1:
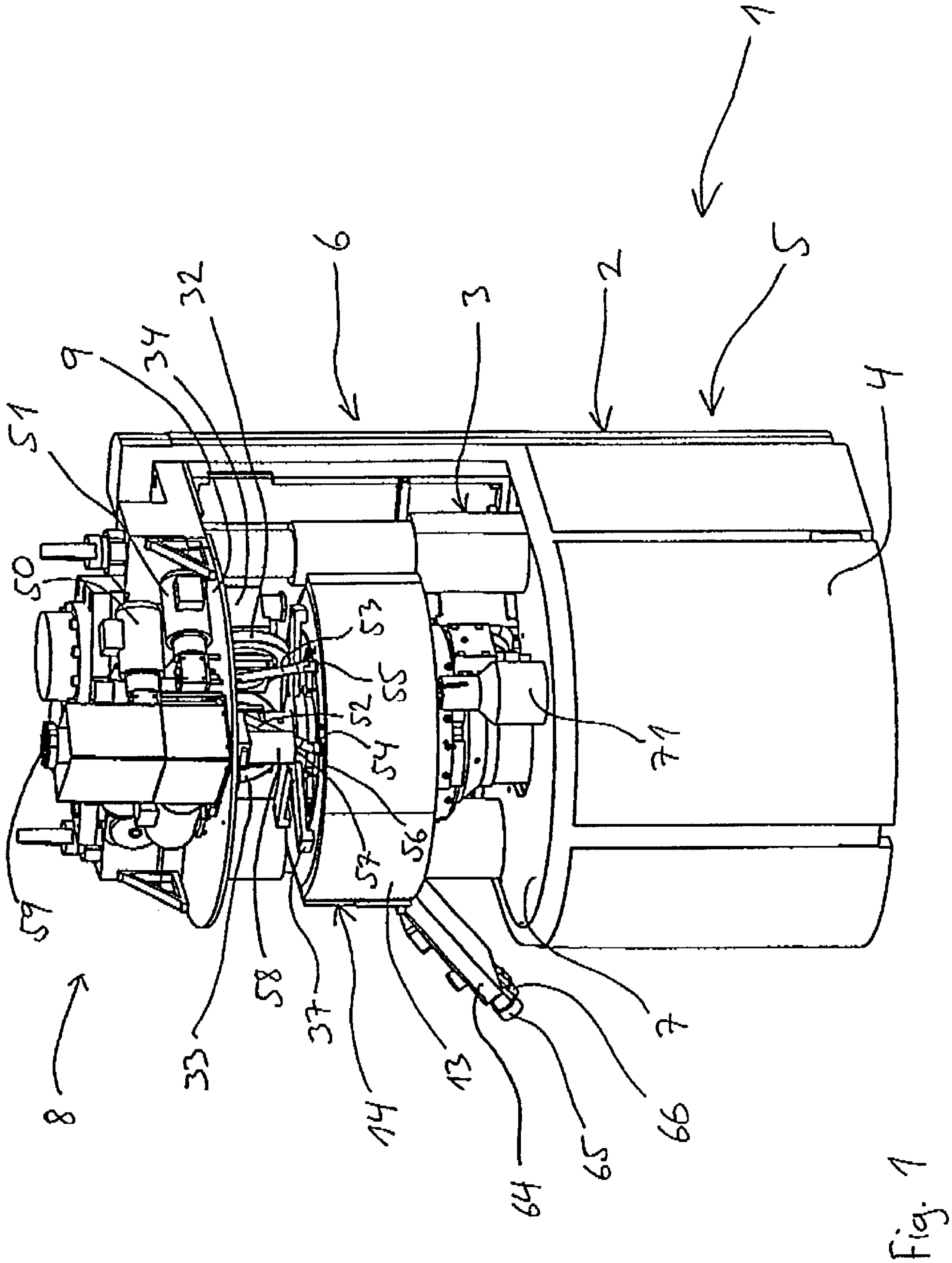
FIG. 1 is a perspective view of a rotary tablet press according to the invention, the cover of the housing being partly removed.

FIG. 1 shows a rotary tablet press 1 for compression of a feedstock in the form of powder or granular material into tablets, compacts or the like. The press shown is of a type suitable for use in the pharmaceutical industry, but the press according to the invention may as well be a so-called industrial press employed in the production of a variety of different products, such as vitamins, pet food, detergents, explosives, ceramics, batteries, balls, bearings, nuclear fuels, etc.

The rotary tablet press 1 has a press housing 2 comprising an internal frame 3, which supports various components located in the housing 2, and an outer lining 4, which is shown only at a lower section 5 of the press. The press housing 2 is composed of three sections, which are located on top of each other and are separated by means of partition walls. The lower section, designated the drive section 5, is separated from a central section, designated the compression section 6, by a lower partition wall 7, and the compression section 6 is separated from an upper section, designated the accessory section 8, by an upper partition wall 9.

Figure 2:
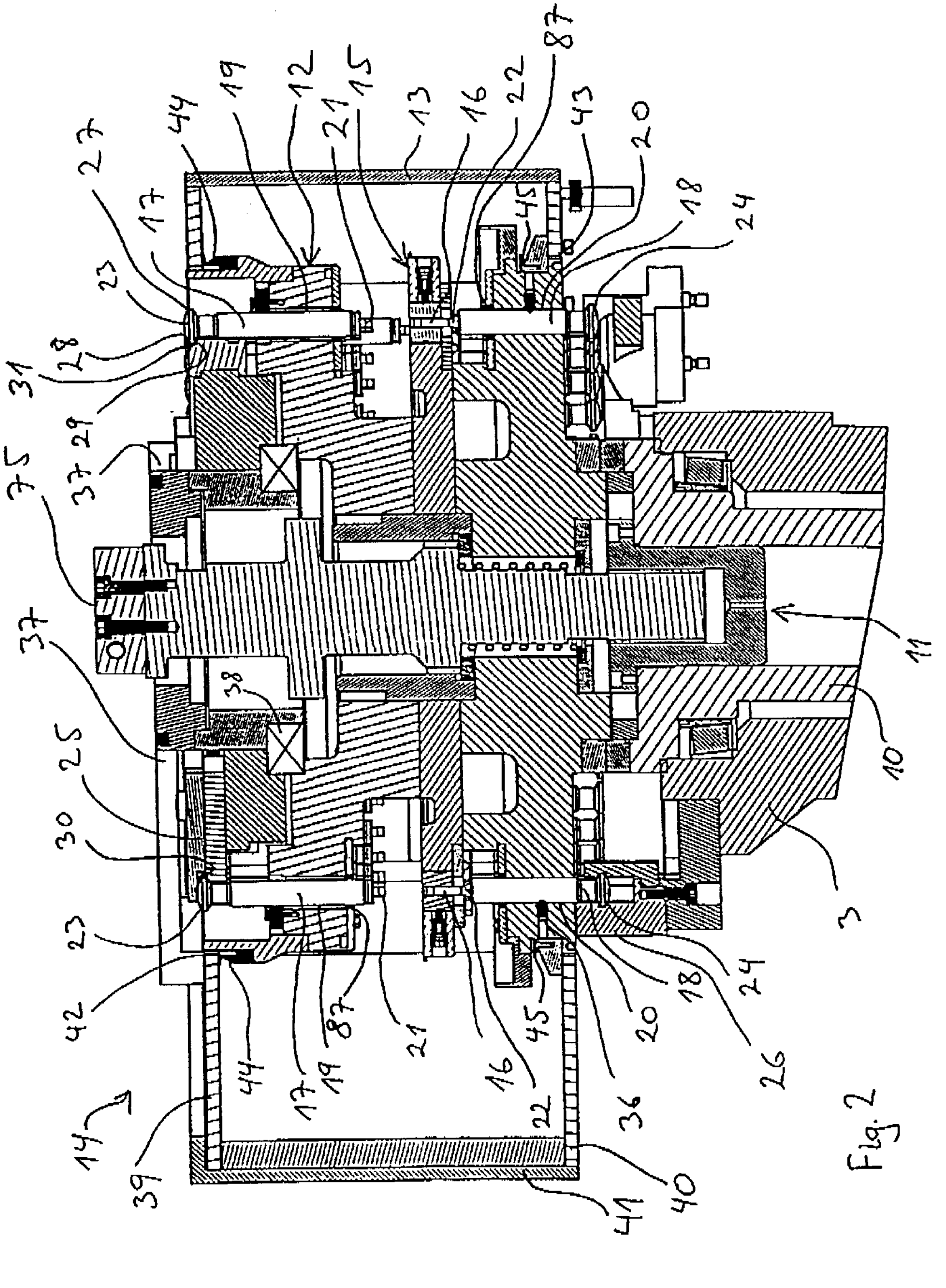
FIG. 2 is an axial section of a compression unit of the tablet press in FIG. 1.
Figure 8:
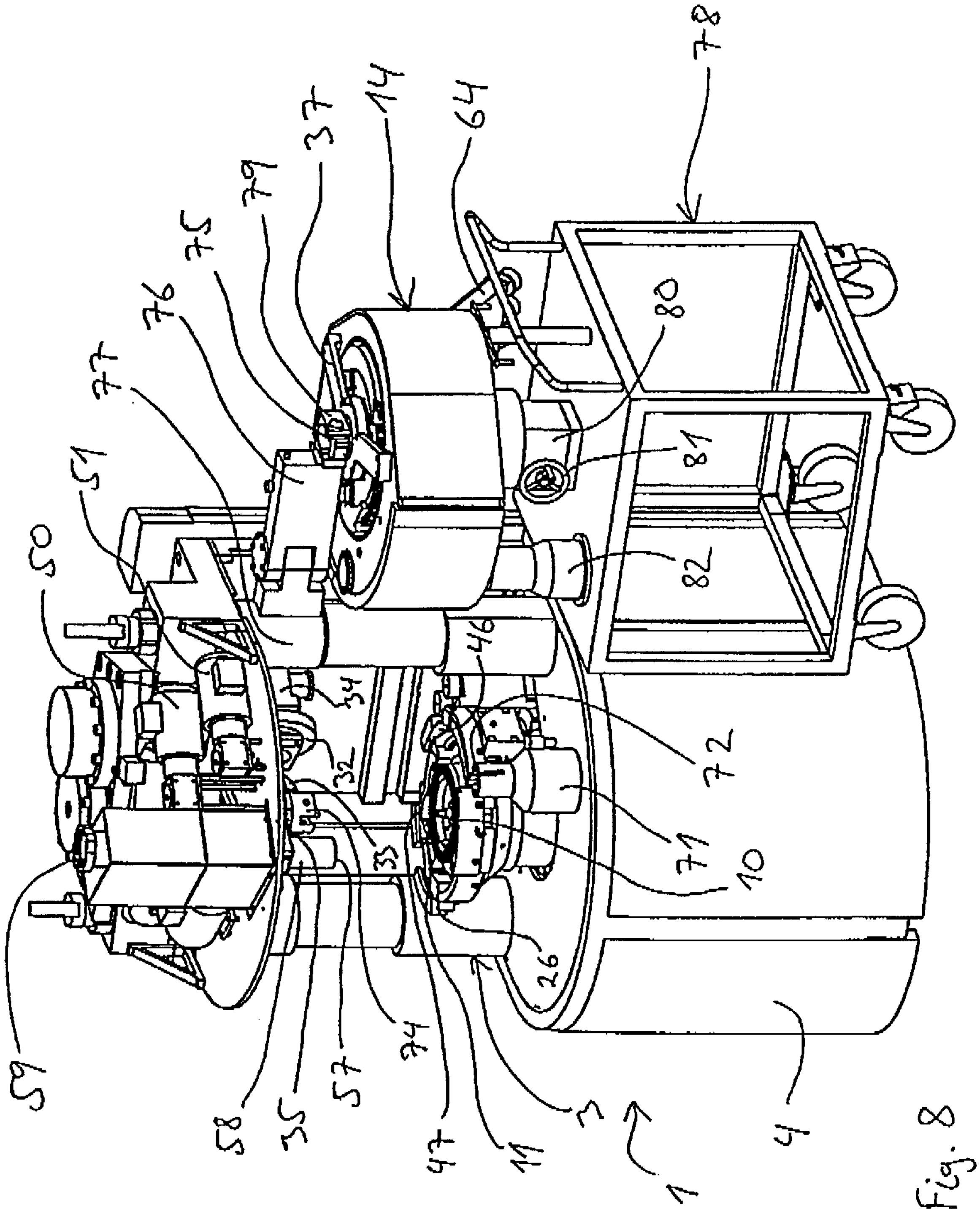
FIG. 8 is a perspective view of the rotary tablet press in FIG. 1 shown with the compression unit in a position for removal.

The drive section 5 comprises a not shown electrical drive motor driving a vertical drive shaft 10 projecting up through a central opening in the lower partition wall 7 and having at its upper end a coupling part 11 for detachable connection with a rotary turret 12 located in a casing 13 of a compression unit 14 which is arranged detachably in the compression section 6 of the press housing 2, see also FIGS. 2 and 8.

Referring to FIG. 2, the rotary turret 12 comprises a die table 15 having a number of dies arranged evenly distributed along its circumference, each die having the form of a bore 16 arranged with its axis parallel to the vertical rotational axis of the turret 12. On either side of the die table 15 are arranged top and bottom punches 17, 18, respectively, in corresponding guides 19, 20 accommodated in the turret 12 so that a first end 21, 22 of each punch 17, 18 is able to enter a corresponding die 16 by displacement of the punch in its guide 19, 20 in order to compress material in the die. The punches 17, 18 are sealed against their guides 19, 20 at the end of these facing the die table 15 by means of lip seals 87. For use with toxic products, a bellows seal, for instance of silicone, may be employed.

A second end 23, 24 of each punch 17, 18 is cooperating with top and bottom cams 25, 26, respectively, arranged stationary in relation to the press housing 2 in order to effect axial displacement of the punches by rotation of the turret 12. Each second end 23, 24 of the punches 17, 18 has a head 27 with an upward side 28 and a downward side 29 for sliding against corresponding surfaces 30, 31 on the cams 25, 26 so that the punches may be pushed both in upward and downward direction as a result of the differing height positions of the cam surfaces 30, 31 in the circumferential direction of the turret. The cams 25, 26 only extend along part of the circumference of the turret, and at that circumferential position where the final compression of the material in the die is to be performed, top and bottom precompression rollers 32, 46 and top and bottom main compression rollers 33, 47, respectively, take over the displacement of the punches 17, 18, see FIGS. 1 and 8. The top rollers 32, 33 are journalled in height adjustable blocks 34, 35 arranged in the housing 2.

The bottom cams 26 are mounted on a part of the frame 3 in such a way that they may be opened to permit removal of the bottom punches 18 together with the compression unit 14 from the housing 2, for instance by removal of that part of the bottom cams bearing the downward cam surfaces 30. However, the bottom cams 26 may also be mounted on the compression unit 14 so that they will be removed together with this. Each bottom punch 18 is provided with a brake system 36 in the form of a spring-loaded ball provided in a bore perpendicular to the guide of the punch, whereby the ball is pressed against the punch circumference and thereby prevents the punch from falling down when leaving the cam where the compression rollers 32, 33 are to take over pressing, as well as after removal of the compression unit from the housing 2. Other brake systems of different construction well-known in the art may also be employed.

The top cams 25 are mounted in the compression unit 14 for removal together with this from the press housing 2 and are by means of a bracket 37 connected rigidly to the casing 13 of the compression unit. The casing 13 is in the mounted position of the compression unit 14 in the press housing 2 held stationary in relation to the latter by means of a not shown releasable connection with the housing. In order to assure correct centring of the top cams 25 and the casing 13 in relation to the turret 12, the cams 25 are by means of a roller and/or ball bearing 38 supported by the turret 12.

The casing 13 of the compression unit 14 comprises a top wall 39, a bottom wall 40 and more side walls 41. A number of the side walls 41 may be detached from the compression unit 14 in order to gain access to the internal components of the unit for exchange of components at change-over between batches of different products, for cleaning or for maintenance, see also FIG. 3, in which one of the side walls has been removed. The top and bottom walls 39, 40 are substantially plane, each having a central circular opening 42, 43 sealed rotatably against the periphery of the turret 12 by means of a seal 44, 45, such as a lip seal. The above-mentioned centring of the casing 13 in relation to the turret 12 by means of bearings assures proper function of the seals 44, 45. Most of the side walls 41 have a curved configuration in order to give the casing 13 a substantially round shape seen from above, thereby obtaining a compact unit and avoiding too many corners where dust can build up in the casing during production.

Figure 3:
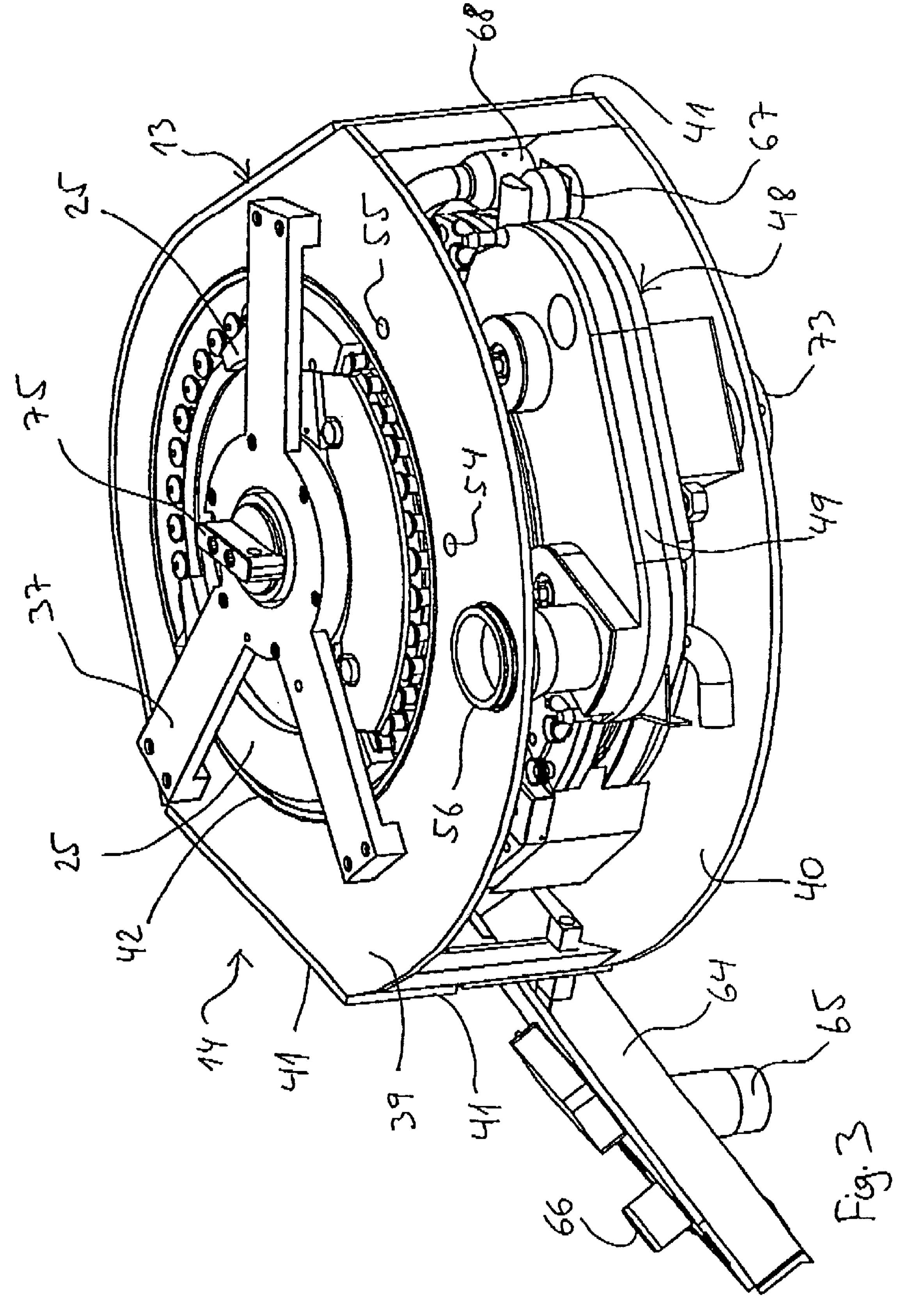
FIG. 3 is a perspective view of the compression unit shown in FIG. 2, the side wall being partly removed.

Referring to FIG. 3, the compression unit 14 is provided with a feeding device in the form of a well-known double rotary feeder 48 with two not shown rotary paddles located in a feeder housing 49 and driven by means of separate drive motors 50, 51 located in the accessory section 8 of the press housing 2 and providing for independent speed setting of the paddles, see also FIG. 1. The feeder housing 49 is open against the die table so that the paddles may ensure proper filling of the dies 16 with feedstock. The paddle drive motors 50, 51 are mechanically connected to the paddles by means of drive shafts 52, 53 of the cardan type, the latter being detachably connected to drive coupling parts 54, 55 located in the top wall 39 of the compression unit 14 and drivingly connected to the respective paddles in the feeder 48. The drive coupling parts 54, 55 may also be located on the feeder housing 49 so that the drive shafts 52, 53 protrude through the top wall 39. After disconnecting the drive shafts 52, 53 from the drive coupling parts 54, 55, the through holes in the top wall 39 may then be closed by means of plugs. Which solution is to be chosen may depend on the toxicity of the product to be handled.

Figure 5:
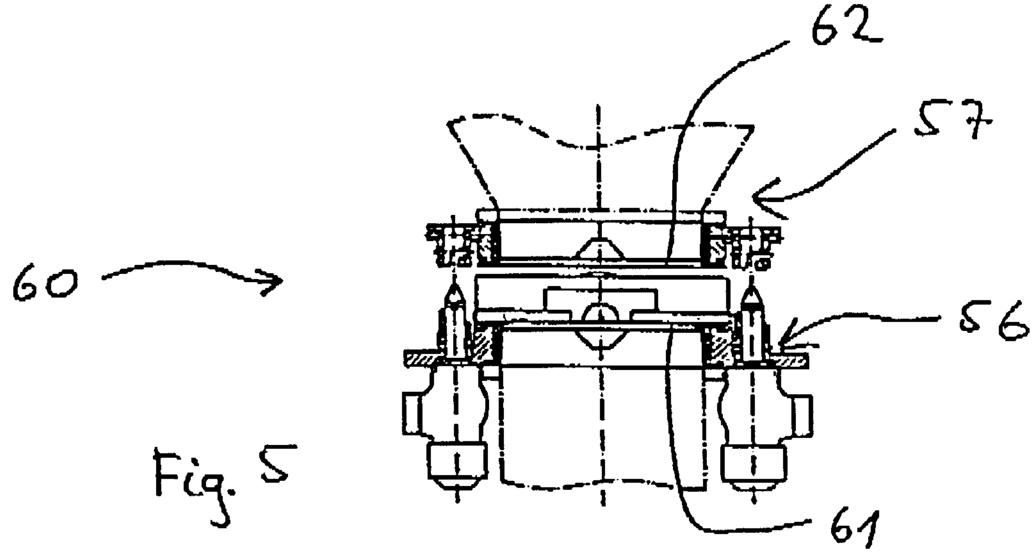
FIGS. 5 to 7 are axial sections through a split butterfly valve shown in different operation positions, respectively.
Figure 6:
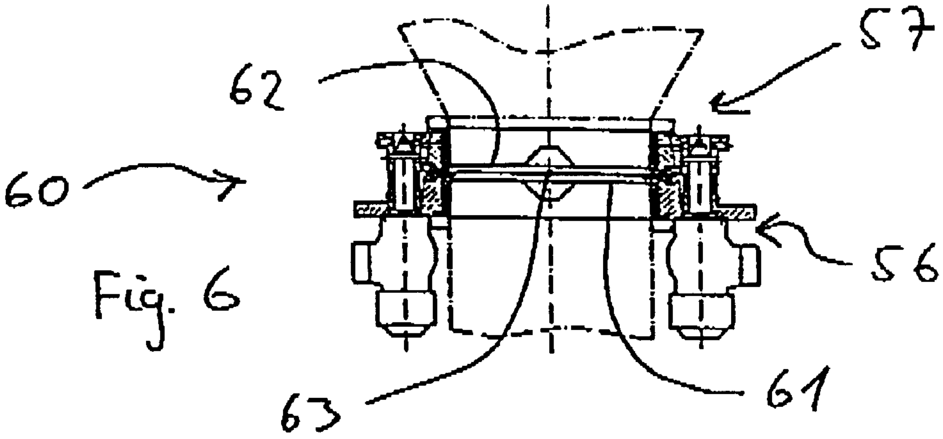
Figure 7:
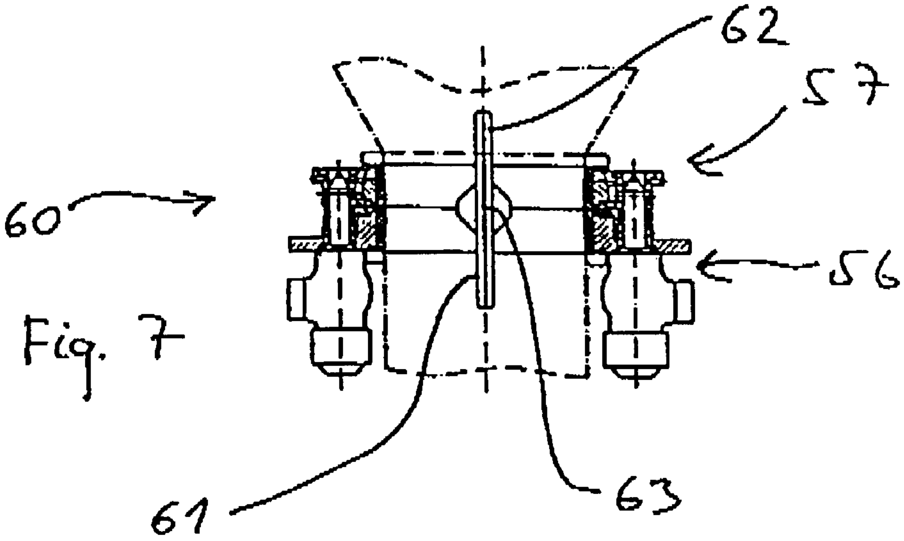

The feeder housing 49 has a feedstock inlet that opens through the top wall 39 of the casing 13 of the compression unit 14 and is provided with a first coupling half 56 for connection with a corresponding second coupling half 57 provided on a lower end of a supply channel 58 in the press housing 2. In FIG. 1, the coupling halves S6, 57 are shown before the interconnection. An upper end of the supply channel 58 is provided with a coupling half 59 for connection with a corresponding coupling half of a not shown, but well-known, supply system, for instance a so-called IBC (Intermediate Bulk Container). The coupling halves 56, 57 may be provided with closing mechanisms, and for operation with toxic products they may constitute a so-called split valve, such as a split butterfly valve. FIGS. 5 to 7 show a split butterfly valve 60 suitable for the mentioned purpose, available from Gea Buck Valve GmbH, Germany. A valve of this type is described in DE 200 14 872 U1. The valve 60 comprises an active and a passive valve flap 61, 62, one of which is journalled in the first coupling half 56, and one of which is journalled in the second coupling half 57, so that each of the coupling halves may be closed by the corresponding flap in the state where the coupling halves are separated, see FIG. 5. After interconnection of the two coupling halves 56, 57, the two valve flaps 61, 62 are aligned and abuts each other as shown in FIG. 6, and by operation of the active flap 61, the two flaps 61, 62 may be turned together about a common axis 63 to reach an open position allowing passage of material through the valve 60, see FIG. 7. The coupling half 56 comprising the active flap 63 may be situated on either one of the compression unit 14 or the press housing 2. Alternatively, for use in less demanding applications, a double ball valve of known type may be used. A double ball valve comprises two separate ball valves which are releasably interconnected. The coupling halves 56, 57 may be cleaned after separation by means of well-known techniques, such as the employment of a mobile cleaning station (CIP) that connects sealingly to the coupling half and automatically cleans the internal parts of the latter. The supply channel 58 in the press housing 2 and other product conducting components in the press housing 2 may be cleaned by similar well-known techniques.

Figure 4:
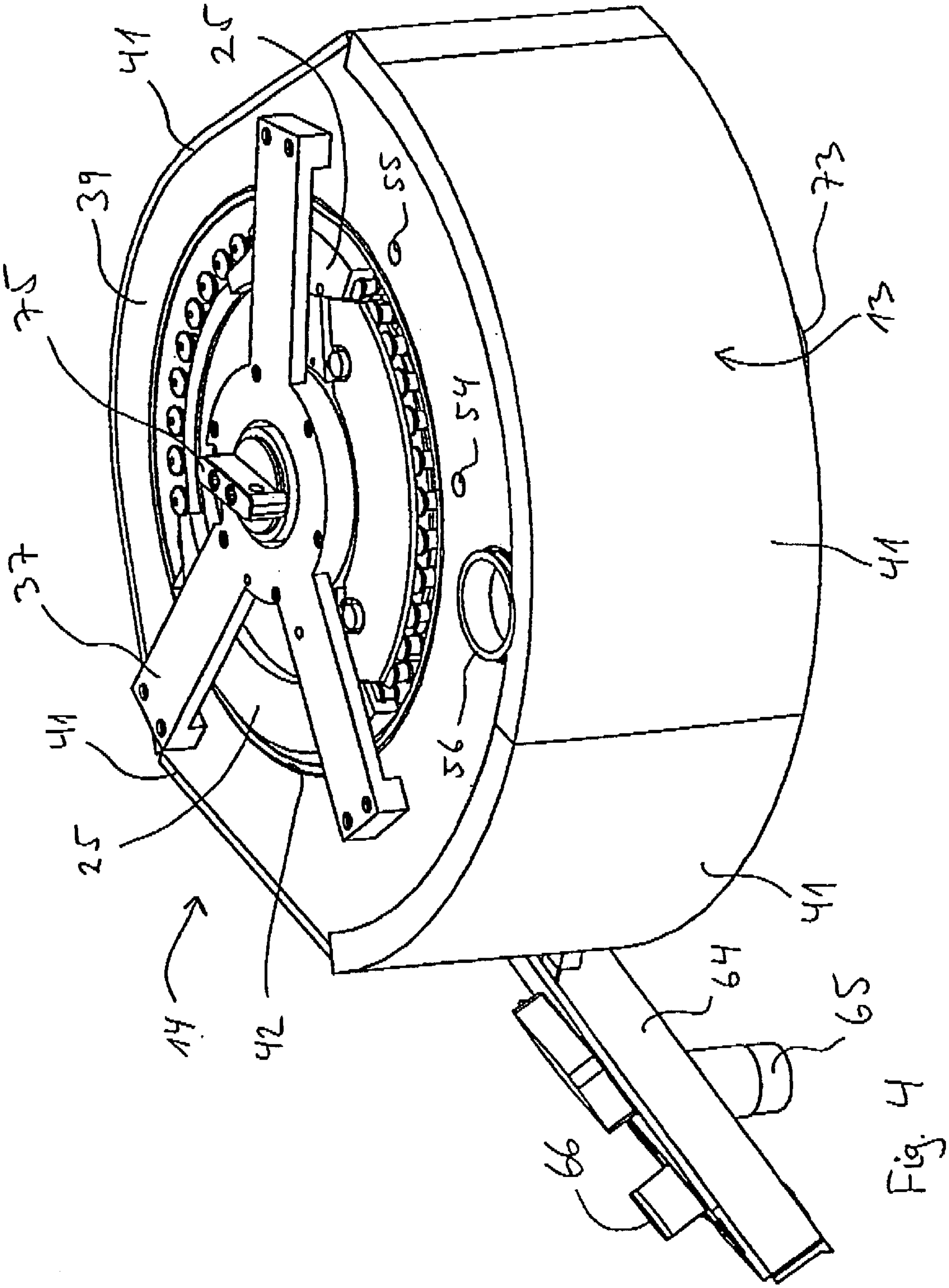
FIG. 4 is a perspective view of the compression unit in FIG. 3 in closed condition.

Referring to FIGS. 3 and 4, the compression unit 14 is further provided with a tablet chute 64 protrudinq from the casing 13 for conducting away compressed material in the form of tablets from the dies 16. In the casing 13, the tablet chute 64 comprises a not shown, but well-known, tablet discharge device in order to collect the tablets from the dies and lead them out through the tablet chute 64. The tablet discharge device may, for instance, be a simple guide plate or chute. The tablet chute 64 has two outlets 65, 66, see also FIG. 1, and is provided with a not shown, but well-known, sorting apparatus leading proper pressed tablets to one of the outlets and defective tablets to the other outlet. The design of the outlets 65, 66 may differ, and FIG. 1 shows a configuration that is different from that shown in FIGS. 3 and 4. The sorting apparatus is electrically driven and controlled by means of not shown electrical connections with the press housing. The outlets 65, 66 may lead the tablets directly into containers and may be provided with a closing mechanism, or they may be connected to a further system of channels by means of couplings, such as the above-mentioned split valves. In the shown configuration, the tablet chute 64 is rigidly connected to the casing 13 and will protrude through the not shown outer lining 4 of the compression section 6 of the press housing 2, and the chute is thereby adapted to be removed from the press housing together with the compression unit 14. However, instead of the shown tablet chute 64, the casing 13 may also be provided with a tablet outlet in the form of a coupling half to be connected with a corresponding coupling half of a tablet channel in the press housing 2, whereby these coupling halves may constitute a split valve of the above discussed type. In this case, the mentioned coupling half of the casing 13 will communicate with the above-mentioned tablet discharge device arranged in the casing.

Further, the compression unit 14 is provided with dust extraction coupling halves 67, 68, see FIG. 3, opening out through the bottom wall 40 of the casing 13 for connection with corresponding, not shown, coupling halves that are located in the press housing 2 and connected to a not shown, well-known, suction system The suction system may advantageously be designed to constantly keep a certain underpressure in the casing 13 of the compression unit 14 in order to prevent any leakage from the casing. The underpressure may advantageously be monitored and controlled to maintain a certain value. The dust extraction coupling halves 67, 68 on the unit 14 may together with the corresponding coupling halves in the press housing 2 constitute split valves of the above-described type. In the compression unit the dust extraction coupling halves 67, 68 connect to not shown dust extraction nozzles placed in appropriate positions in the casing to prevent build-up of dust in the casing.

On the lower partition wall 7 in the press housing 2 there is provided a support column 71 with an upper pneumatic coupling half 72 for connection with a corresponding coupling half 73 supporting the rotary feeder 48 in the compression unit 14. The position of the coupling half 72 may be adjusted in relation to the support column 71, resulting in an adjustment of the position of the feeder 48 in relation to the turret 12. By this adjustment, the coupling half 73 supporting the feeder is displaced slightly in the casing 13. The coupling half 73 projects through the bottom wall 40 of the casing 13 in a tightly sealed manner known per se.

Further, the compression unit 14 is provided with well-known systems for punch lubrication, the lubrication oil or grease being supplied from the press housing through conduits connected to the compression unit via releasable couplings provided with closure mechanisms as explained above. A suitable coupling for this purpose is a so-called quick-acting coupler available from Legris Belgium SA. Lubrication fluid for die wall and punch face lubrication may be provided in similar ways.

Generally, for use with toxic products, all product conduit connections between the compression unit 14 and the press housing 2 may advantageously be in the form of the above split butterfly valves. Alternatively, the product conduit connections between the compression unit 14 and the press housing 2 may be in the form of disposable plastic tubes that are cut into two before disengagement of the compression unit from the press housing. Before cutting the tube, it is pressed flat and heated up in order to block the tube connection by welding together its wall. The tube is cut in the middle of the welding so that the resulting two tube parts are blocked and prevent leakage of product to the surroundings. When mounting a cleaned compression unit in the press housing, new plastic tubes are mounted at the connections. Other connections, such as electrical or mechanical releasable connections, enter the casing 13 of the compression unit 14 through appropriate seals.

In order to clean the interior of the compression unit 14 between batches of different products or in order to exchange the unit for another type of unit, the tablet press 1 is equipped with a handling system for removal of the unit from the press and for placement of another unit in the press, see FIG. 8. The height adjustable block 35 carrying the compression roller 33 is provided with a coupling element 74 for engagement with a corresponding coupling element 75 on the Compression unit 14. In this way, the compression unit 14 may by means of the height adjustable block 35 be lifted to a position in which the turret 12 is out of engagement with the coupling part 11 on the drive shaft 10. In this position, the compression unit 14 may by means of a swivel arm 76 pivotally journalled about the axis of a vertical pillar 77 of the frame 3 be swung out of the press housing 2 to a position where it may be set off on a carriage 78 for transferral of the unit 14 to a cleaning station, for instance. For this purpose, the swivel arm 76 is provided with a coupling element 79 for engagement with the coupling element 75 on the compression module 14. The carriage 78 is provided with a block 80 for pivotally supporting the turret 12, the block being equipped with a handle 81 for rotation of the turret, in order to facilitate removal of punches from the turret, etc. Further, the carriage 78 is provided with a support column 82 corresponding to the support column 71 in the press housing 2 for supporting the feeder during rotation of the turret and movement of the carriage 78.

Figure 9:
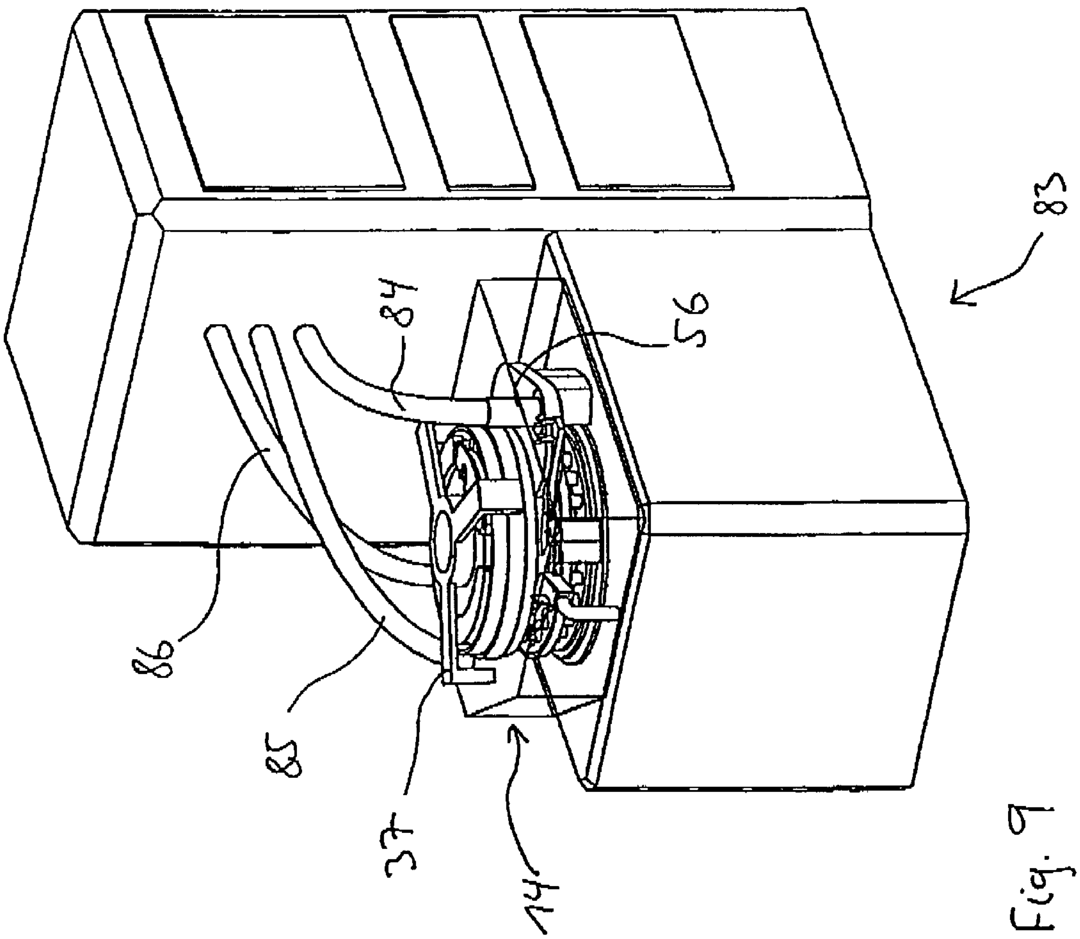
FIG. 9 is a cleaning station according to the invention with an attached compression unit.

FIG. 9 shows very schematically a first embodiment of an automated cleaning station 83 according to the invention. The cleaning station 83 may be provided with a not shown handling system similar to that of the tablet press 1 in order to lift the compression unit 14 from the carriage 78 to its mounted position in the cleaning station and back to the carriage again, Tubes 84, 85, 86 for supply and drainage of cleaning fluid are by means of suitable connecting pieces in the form of coupling halves connected to the compression unit 14 at the coupling half 56 for feedstock inlet, at the tablet outlet and at a dust extraction coupling half. There may be employed more cleaning fluid tubes than shown on the drawing, and there may also on the compression unit 14 be provided dedicated cleaning fluid inlet/outlet connections that are closed during tablet production. The cleaning fluid may be circulated in alternating directions through the respective tubes, thereby providing a more effective cleaning action in the casing 13 of the compression unit 14. Hot air or gas may be introduced through the tubes after cleaning, in order to effect drying. Further, the tubes 84, 85, 86 may be replaced by cleaning fluid devices in the form of positionable supply and drainage chambers likewise having coupling halves fitting the coupling halves on the compression unit, but further having cleaning fluid spray nozzles arranged for automatic introduction through the corresponding coupling halves 56, 67, 68 on the compression unit 14.

In a second, not shown embodiment of an automated cleaning station there is provided a cleaning chamber in which the compression unit 14 may be inserted and which may then be closed. In the chamber, the compression unit 14 will be opened by means of an automatic manipulator, whereby one or more of the side walls 41 will be removed fully or partially from the unit. The side walls 41 may for instance be hinged to the unit 14 so that they may be opened like doors. Possibly internal components of the compression unit may also be opened by means of manipulators for better access of spray nozzles during washing, for instance the feeder housing 49 may be opened, and components may be agitated for better cleaning effect. The punches 17, 18 may be removed from their guides 19, 20. The cleaning chamber is provided with spray nozzles, possibly automatically displaceable, for cleaning fluid, and inlets, also possibly in the form of nozzles, for hot air or gas for drying.

The cleaning chamber may be modified so that the second punch ends 23, 24 are accessible for actuation from outside the cleaning chamber. This may be achieved by providing openings in a top and a bottom wall of the cleaning chamber, respectively, whereby the second punch ends 23, 24 are accessible from outside the cleaning chamber through these openings, and the peripheries of the openings are sealed against the top and bottom walls of the compression unit 14, respectively, in the cleaning position of the unit in the cleaning chamber. The internal of the unit 14 may be accessed by opening the side walls 41 in the cleaning chamber, as explained above. In this way, the cams and the second punch ends are not cleaned and consequently do not require re-lubrication after cleaning the unit 14.

In both embodiments of the cleaning station, the following provisions may be employed. The turret may be rotated during cleaning by means of a not shown drive shaft corresponding to the drive shaft 10 in the press housing 2, whereby the punches may be displaced, possibly in and out of their dies, thereby providing a more effective cleaning. Dedicated cams especially suited for the cleaning operation may be employed, or the position of existing cams 25, 26 on the unit may be adjusted in the cleaning station. Further, the paddles of the rotary feeder may be rotated by drive axles corresponding to the axles 52, 53 of the press 1.

The different types of cleaning station may be more or less automated, and of course also manual cleaning of the compression unit 14, for instance in a glove box, is possible.

According to the invention, cleaning of the tablet press 1 between batches may be performed fast and easily without exposing the operator to the product or contaminating the environment, because the compression unit 14 encloses the product during tablet production as well as during transport of the unit to the cleaning station.

The invention has in the above been explained by means of a tablet press having a single feeding device and a single tablet discharge device; however, the tablet press according to the invention may have several tablet discharge devices and and/or several feeding devices arranged in combination with a single die table. For instance, the press may be a so-called double-sided press having two production units arranged in the compression unit, each production unit comprising one feeding device and one tablet discharge device. Prior art presses with as many as five production units are known. In addition, the press may be a so-called multilayer press, having, for instance, two feeding devices and one tablet discharge device. In such a press, tablets comprising two layers may be produced. After feeding the first layer by means of the first feeding device, the tablet is compressed by the punches, the next layer is subsequently fed by means of the next feeding device, and finally the tablet is compressed a second time.

Although the invention in the above has been explained by means of a rotary tablet press having vertically oriented punches and a rotary feeder, the invention is equally well applicable to different types of presses, such as for instance a rotary press having a die table with punches arranged radially displaceable therein, as disclosed for instance in U.S. Pat. No. 5,910,324 (Courtoy) or U.S. Pat. No. 4,403,935. In such a press, the feedstock may be lead to the dies through a channel arranged centrally in relation to the turret of the press and by means of the centrifugal force driven through radial channels to the dies, whereby the interior of the feeding device will be enclosed separately in relation to its surroundings. The die table and the tablet outlet device may then be enclosed in a common casing in the same way as explained in the above by means of the embodiment shown on the drawing. As the feedstock inlet channel may enter centrally through the casing of the compression unit, at least part of the casing may rotate with the turret and need not be stationary in the press.

In a similar way, it would be possible to design the tablet discharge device with a central outlet, overcoming the centrifugal force by appropriate means, such as suction means or well-known mechanical transport means. Thereby, the interior of the tablet discharge device will be enclosed separately in relation to its surroundings. In a compression unit with separately enclosed feeding device and tablet outlet device, respectively, each die opening and its corresponding first punch end may be enclosed in relation to their surroundings in a separate chamber, instead of in a common casing as explained in the above.

Similarly, the invention is applicable to different types of presses having a so-called gravity feeder instead of a rotary feeder. A gravity feeder is in its simplest form a funnel-shaped feedstock inlet and is used in many industrial presses, for instance for the production of batteries or electronic components. Another kind of feeding system that may equally be applied is a so-called vibration feeder, which basically is a funnel-shaped feedstock inlet that is vibrated during feeding by means of an electric or mechanic drive. In fact, according to the invention, any kind of suitable feeding system may be applied. Further, any kind of auxiliary equipment may be located in the compression unit 14 and connected to the press housing 2 via releasable connections.

What is claimed is:

1. A rotary tablet press comprising a housing, a rotary die table detachably connected to a drive shaft arranged in the housing for rotation of the die table, a number of dies arranged circumferentially in the die table, each die being associated with at least a first punch having a first end receivable in the die through an opening of the die and arranged for compression of a powder or granular material in the die by reciprocation of the punch, and at least a cam for cooperation with a second end of the punches in order to effect axial displacement of the punches by rotation of the die table, whereby a compression unit detachably mounted in the housing comprises the die table with punches, a feeding device for the supply of material to be compressed into the dies, and a tablet discharge device for removal of compressed material in the form of tablets, wherein the compression unit encloses each die opening and its corresponding first punch end in a chamber, the feeding device and the tablet discharge device are enclosed, the feeding device communicates with an inlet for detachable connection with an external supply channel, and the tablet discharge device communicates with an outlet.

2. A rotary tablet press according to claim 1, wherein the second punch ends are accessible for actuation from outside the compression unit.

3. A rotary tablet press according to claim 1, wherein the compression unit comprises a casing surrounding at least part of the die table, the feeding device and the tablet discharge device, and the inlet and the tablet outlet are arranged in a wall of the casing.

4. A rotary tablet press according to claim 3, wherein the casing of the compression unit is provided with a releasable opening mechanism for opening of at least one door in the casing or detachment of at least a part of the casing from the compression unit.

5. A rotary tablet press according to claim 4, wherein each die is associated with first and second punches arranged for reciprocation in a direction parallel with the axis of rotation of the die table, the first and second punches are received in guides on either side of the die, respectively, said guides being accommodated in a rotary turret comprising the die table, the casing comprised by the compression unit surrounds the periphery of the turret and is sealed against the latter by means of seals permitting rotation of the turret in relation to the casing, and the casing has a bracket mounted rotatably on the turret by means of a bearing.

6. A rotary tablet press according to claim 5, wherein the punches are sealed against their guides at the first punch ends by means of seals permitting axial displacement of the punches in the guides, such as lip seals or bellows seals.

7. A rotary tablet press according to claim 1, wherein the compression unit has auxiliary devices communicating with the press housing via releasable connections, such as dust aspiration nozzles communicating with the press housing via releasable tube connections, a powder feeder driven through a releasable shaft connection by means of a drive accommodated in the tablet press housing, a lubrication system communicating with the press housing via releasable tube connections, etc.

8. A rotary tablet press according to claim 1, wherein releasable conduit connections between inlets or outlets of the compression unit and corresponding channels in the press housing are provided with a closure mechanism on either side of a disconnection mechanism.

9. A rotary tablet press according to claim 8, wherein the releasable conduit connections are in the form of so-called double ball valves.

10. A rotary tablet press according to claim 8, wherein the releasable conduit connections are in the form of so-called split valves having two mating valve members, such as split butterfly valves.

11. A rotary tablet press according to claim 8, wherein the releasable conduit connections are in the form of plastic tubes.

12. A rotary tablet press according to claim 1, wherein a number of top cams for cooperation with first punches and a number of bottom cams for cooperation with second punches are mounted on the compression unit for removal from the press housing together with the compression unit.

13. A rotary tablet press according to claim 1, wherein a number of top cams for cooperation with first punches are mounted on the compression unit for removal from the press housing together with the compression unit, and a number of bottom cams for cooperation with second punches are mounted in the press housing so that the second punches are releasable from the bottom cams for removal from these together with the compression unit.

14. A rotary tablet press according to claim 1, wherein a top cam for cooperation with punches is mounted adjustably on the compression unit.

15. A rotary tablet press according to claim 1, wherein a compression roller for cooperation with first punches is supported above the compression unit by a height adjustable block, and the height adjustable block has a coupling element for engagement with a corresponding coupling element on the compression unit.

16. A rotary tablet press according to claim 1, wherein the press housing is provided with a swivel arm pivotal about a vertical axis and provided with a coupling element for engagement with a corresponding coupling element on the compression unit.

17. A rotary tablet press according to claim 1, wherein the press housing is provided with a separate support for the feeding device, the feeding device is displaceable in relation to the compression unit, and said support has a snap coupling mechanism such as a pneumatic coupling mechanism for connection with the feeding device.

18. A compression unit for releasable attachment in the housing of a rotary tablet press, the compression unit comprising a rotary die table for connection to a drive shaft arranged in the press housing for rotation of the die table, a number of dies arranged circumferentially in the die table, each die being associated with at least a first punch having a first end receivable in the die through an opening of the die and arranged for compression of a powder or granular material in the die by reciprocation of the punch, a feeding device for the supply of material to be compressed into the dies, and a tablet discharge device for removal of compressed material in the form of tablets, wherein the compression unit encloses each die opening and its corresponding first punch end in a chamber, the feeding device and the tablet discharge device are enclosed, the feeding device communicates with an inlet for detachable connection with an external supply channel, and the tablet discharge device communicates with an outlet.

19. A compression unit according to claim 18, wherein the compression unit comprises a casing surrounding at least part of the die table, the feeding device and the tablet discharge device, the inlet and a tablet outlet are arranged in a wall of the casing, and the casing of the compression unit is provided with a releasable opening mechanism for opening of at least one door in the casing or detachment of at least a part of the casing from the compression unit.

20. A method of manufacturing tablets or the like in a rotary tablet press having a press housing and a compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets or the like, whereby the compression unit between batches of tablets is detached from the press housing and transferred to a cleaning station, wherein during the pressing of tablets or the like and during the transfer of the compression unit to the cleaning station each die opening and its corresponding first punch end are maintained enclosed in a chamber of the compression unit and the feeding device and the tablet discharge device are maintained enclosed.

21. A rotary tablet press, comprising:

a housing, a rotary die table detachably connected to a drive shaft arranged in the housing for rotation of the die table, a plurality of dies arranged circumferentially in the die table, each die being associated with at least a first punch having a first end receivable in the die through an opening of the die and arranged for compression of a powder or granular material in the die by reciprocation of the punch, and at least one cam for cooperation with a second end of the punches in order to effect axial displacement of the punches by rotation of the die table, whereby a compression unit detachably mounted in the housing comprises:

the die table with punches, a feeding device for the supply of material to be compressed into the dies, and a tablet discharge device for removal of compressed material in the form of tablets, wherein the compression unit encloses each die opening and its corresponding first punch end in a chamber, the feeding device and tablet discharge device are enclosed, the feeding device communicates with an inlet for detachable connection with an external supply channel, and the tablet discharge device communicates with an outlet, said rotary tablet press further comprising a cleaning station for cleaning of said compression unit detached from said rotary press, wherein said cleaning station comprises:

at least two separate cleaning fluid devices, each having a connection piece for detachable connection with a corresponding connection piece provided on the compression unit and communicating with an enclosure of the compression unit, wherein the cleaning fluid devices are arranged for the supply of cleaning fluid to the compression unit and for the drainage of cleaning fluid from the compression unit.

22. A method of manufacturing tablets or the like in a rotary tablet press having a press housing and a compression unit comprising a number of dies arranged circumferentially in a rotary die table, each die being associated with at least a first punch having a first end receivable in the die through an opening of the die, a feeding device for the supply of material to be compressed into the dies, and a tablet discharge device for removal of compressed material in the form of tablets or the like, wherein the method comprises:

pressing a plurality of tablets in batches, detaching the compression unit between batches of tablets from the press housing, and transferring the compression unit to a cleaning station, wherein during the pressing of tablets or the like and during the transfer of the compression unit to the cleaning station, each die opening and its corresponding first punch end are maintained enclosed in a chamber of the compression unit and the feeding device and the tablet discharge device are maintained enclosed, and said method further comprising:

supplying a cleaning fluid to an enclosure of said compression unit from at least one cleaning fluid device which is in communication with said enclosure of the compression unit, wherein said fluid device has a connection piece which is connected with a corresponding connecting device on said enclosure of the compression unit.

* * * * *